United States Patent
Gilling et al.

(10) Patent No.: US 11,250,040 B2
(45) Date of Patent: Feb. 15, 2022

(54) SYSTEMS AND METHODS FOR EXTRACTING INFORMATION FROM A TEXT STRING GENERATED IN A DISTRIBUTED COMPUTING OPERATION

(71) Applicant: Capital One Services, LLC, McLean, VA (US)

(72) Inventors: John Gilling, Brooklyn, NY (US); Michael Walters, Brooklyn, NY (US); Chang W. Kim, Wyckoff, NJ (US); Pavel Fort, Westbury, NY (US)

(73) Assignee: Capital One Services, LLC, McLean, VA (US)

( * ) Notice: Subject to any disclaimer, the term of this patent is extended or adjusted under 35 U.S.C. 154(b) by 309 days.

(21) Appl. No.: 15/788,773

(22) Filed: Oct. 19, 2017

(65) Prior Publication Data

US 2019/0121904 A1    Apr. 25, 2019

(51) Int. Cl.
G06F 16/33    (2019.01)

(52) U.S. Cl.
CPC ........ *G06F 16/334* (2019.01); *G06F 16/3332* (2019.01)

(58) Field of Classification Search
None
See application file for complete search history.

(56) References Cited

U.S. PATENT DOCUMENTS

| | | | | |
|---|---|---|---|---|
| 7,165,037 | B2 * | 1/2007 | Lazarus | G06Q 30/02 705/7.31 |
| 7,533,638 | B1 * | 5/2009 | Berger | F02B 75/045 123/48 B |
| 8,175,908 | B1 | 5/2012 | Anderson | |
| 9,529,863 | B1 * | 12/2016 | Gindin | G06Q 40/00 |
| 9,542,456 | B1 | 1/2017 | Das et al. | |
| 9,898,515 | B1 * | 2/2018 | Avagyan | G06F 16/29 |
| 10,354,237 | B2 * | 7/2019 | Kanjlia | G06Q 20/10 |
| 2005/0159996 | A1 * | 7/2005 | Lazarus | G06Q 30/02 705/7.31 |
| 2006/0294151 | A1 * | 12/2006 | Wong | G06F 16/25 |
| 2008/0091408 | A1 * | 4/2008 | Roulland | G06F 17/271 704/9 |

(Continued)

OTHER PUBLICATIONS

Motro et al. Fusionplex: resolution of data inconsistencies in the integration of heterogeneous information sources. Information Fusion 7 (2006) 176-196. doi:10.1016/j.inffus.2004.10.001. URL Link: <http://citeseerx.ist.psu.edu/viewdoc/download?doi=10.1.1.94.5564> Accessed Nov. 2020. (Year: 2006).*

(Continued)

*Primary Examiner* — Irene Baker
(74) *Attorney, Agent, or Firm* — Finnegan, Henderson, Farabow, Garrett & Dunner, LLP (57) ABSTRACT

Systems and methods are disclosed that provide for extracting information from a text string. In certain embodiments, a system is disclosed to receive a textual string representative of a distributed computing operation. The system is configured to isolate an identifier included in the textual string based on information in the textual string and/or other information associated with the distributed computing operation. The system is also configured to provide the identifier to a computer device over a network.

9 Claims, 6 Drawing Sheets

(56) References Cited

U.S. PATENT DOCUMENTS

| | | | |
|---|---|---|---|
| 2009/0228365 A1* | 9/2009 | Tomchek | G06Q 20/24 705/21 |
| 2010/0312636 A1* | 12/2010 | Coulter | G06Q 20/10 705/14.38 |
| 2012/0072409 A1* | 3/2012 | Perry | G06Q 30/0601 707/710 |
| 2013/0297634 A1 | 11/2013 | Shami et al. | |
| 2015/0356690 A1* | 12/2015 | Celikyilmaz | G06Q 40/12 705/30 |
| 2017/0052958 A1* | 2/2017 | Manning | G06F 16/35 |
| 2017/0178247 A1* | 6/2017 | Farrell | G06F 16/215 |
| 2017/0199875 A1* | 7/2017 | Nevrekar | G06F 16/9032 |
| 2017/0262757 A1* | 9/2017 | Martin | G06Q 10/105 |
| 2017/0293677 A1* | 10/2017 | Boguraev | G06F 16/3344 |
| 2018/0181951 A1* | 6/2018 | Goldfinger | G07G 1/0009 |
| 2018/0246943 A1* | 8/2018 | Avagyan | G06F 16/285 |
| 2019/0354544 A1* | 11/2019 | Hertz | G06F 16/338 |

OTHER PUBLICATIONS

Lowery, Bret, Adventures in Engineering: Taming the Transactions, Sep. 13, 2016 (2 pages).

Anderson et al., Standardizing +113 million Merchant Names in Financial Services with Greenplum Hadoop, Jan. 28, 2013 (6 pages).

Yodlee, Transaction Data Enrichment, retrieved from internet Oct. 9, 2017, https://www.yodlee.com/products/data-analytics/transaction-data-enrichment/ (4 pages).

* cited by examiner

SYSTEMS AND METHODS FOR EXTRACTING INFORMATION FROM A TEXT STRING GENERATED IN A DISTRIBUTED COMPUTING OPERATION

TECHNICAL FIELD

The disclosed embodiments generally relate to extracting information related to a distributed computer process, and more particularly, information extracted from a text string.

BACKGROUND

As computer networks become more advanced, computing processes are more and more often competed in remote locations by complicated interconnected systems. Often, these systems are maintained by multiple entities, loosely affiliated with each other, or unaffiliated entirely. While such cooperation allows valuable functionality and scale, differences in configuration and monitoring can lead to difficulty understanding system status or outcomes of processes performed by a system.

Often such systems create and maintain vast quantities of information that could provide valuable insights into the operation of the systems. Barriers to using this information include inconsistencies in how the information is represented. These inconsistencies can prevent aggregation and analysis of information concerning the operations of the system.

Thus, a need exists for systems and methods extracting information generated during such distributed computing processes.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of merchant systems and environments for ease of discussion, it is to be understood that the disclosed embodiments are not limited to any particular industry. Instead, disclosed embodiments may be practiced by any entity in any industry that would benefit from an improved understanding of individual or collective human behavior.

Disclosed embodiments may include a system for extracting information from a text string. The system may comprise one or more memory devices storing instructions, and one or more hardware processors configured to execute the instructions to perform operations. The operations may include receiving a textual string representative of a distributed computing operation. The operations may also include isolating an identifier included in the textual string, from other information included in the textual string. The operations may also include isolating a first attribute from the textual string, the first attribute suspected to be associated with the identifier. The operations may also include determining a confidence score as to whether the first attribute is associated with the identifier and providing, to a computer device over the network, the identifier, the first attribute, and the confidence score.

Disclosed embodiments may include a method for extracting information from a text string. The method may include receiving, a textual string representative of a distributed computing operation. The method may also include isolating an identifier included in the textual string, from other information included in the textual string. The method may also include isolating a first attribute from the textual string, the first attribute suspected to be associated with the identifier. The method may also include determining a confidence score as to whether the first attribute is associated with the identifier and providing, to a computer device over the network, the identifier, the first attribute, and the confidence score.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Certain disclosed embodiments provide systems and methods for extracting information from a text string generated in a distributed computing operation. The extracted information may provide insight into complex operations of computers that operate in concert, but may be controlled and operated by different entities in different ways. Thus, information that may be inconsistent or uninterpretable in its raw form may be refined to provide valuable insight.

Figure 1:
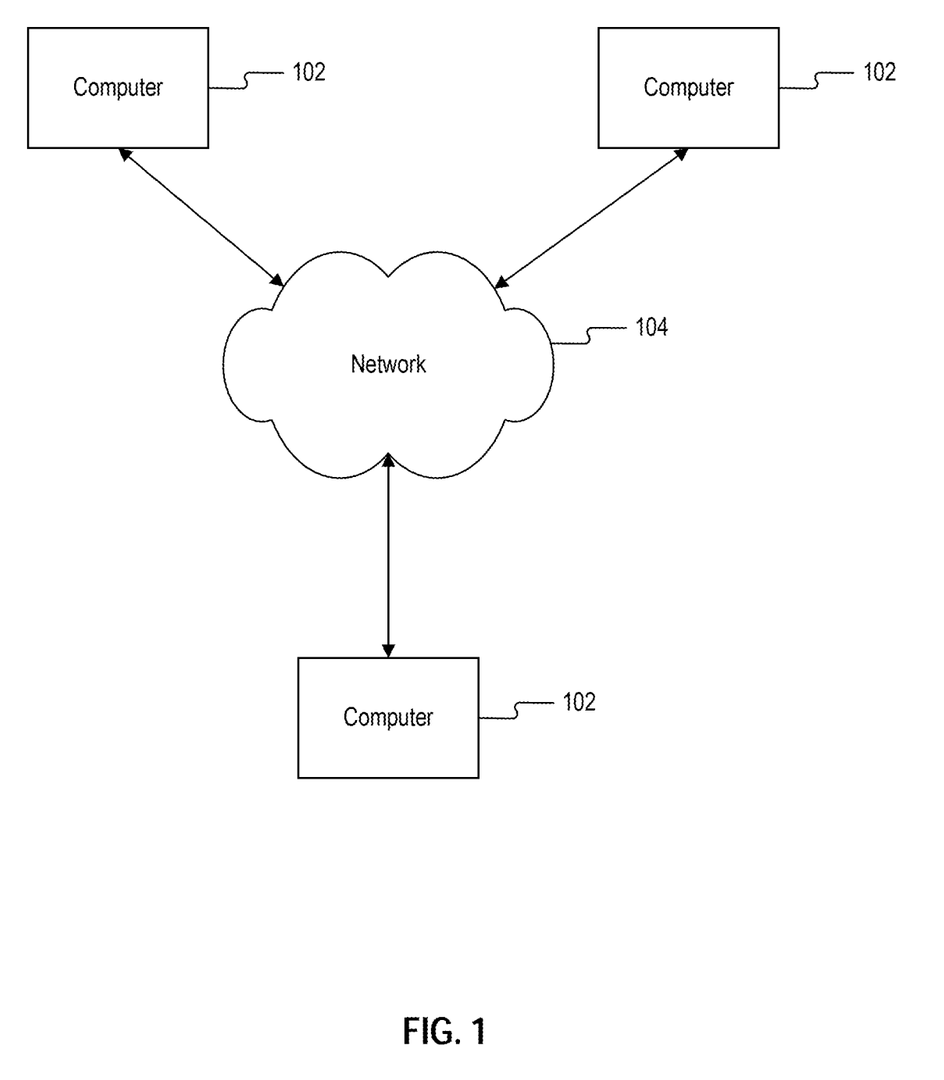
FIG. 1 is a block diagram of an exemplary distributed computing environment, consistent with disclosed embodiments.

FIG. 1 is a block diagram of an exemplary environment for extracting information from a text string generated in a distributed computing operation, consistent with disclosed embodiments. As shown in FIG. 1, system 100 may include computers 102, as well as a communication network 104 to facilitate communication among the computers, as well as other components of system 100 (not shown). The components and arrangement of the components included in system 100 may vary. Thus, system 100 may further include additional or fewer computers 102, as well as other components that perform or assist in the performance of one or more processes consistent with the disclosed embodiments, such as user devices or databases (not shown). The components and arrangements shown in FIG. 1 are not intended to limit the disclosed embodiments, as the components used to implement the disclosed processes and features may vary.

System 100 may include one or more computers 102. A computer 102 may comprise a desktop computer, a server, a point of sale device, a laptop, a tablet, a smartphone, a multifunctional watch, a pair of multifunctional glasses, or any other suitable computing device. A computer 102 may include one or more processor(s) and memory device(s) known to those skilled in the art. For example, a computer 102 may include memory device(s) that store data and software instructions that, when executed by one or more processor(s), perform operations consistent with the disclosed embodiments. In one aspect, computer 102 may have an application installed thereon, which may allow computer 102 to communicate with other computer(s) 102 configured as back-end servers and/or databases via communication network 104. For instance, a computer 102 may be a smartphone or tablet (or the like) that executes an application that logs computer into the back-end server. In some embodiments, computer 102 may connect to back-end servers through an application programming interface configured to communicate information to the back-end servers, or through use of browser software stored and executed by computer 102.

Computer(s) 102 may include or may access one or more storage devices (e.g., FIG. 2, memory 230 and/or database 260) configured to store data and/or software instructions used by one or more processors of computer(s)s 102 to perform operations consistent with disclosed embodiments. For example, a computer 102 may include memory 230 configured to store one or more software programs that performs various functions when executed by a processor. The disclosed embodiments are not limited to separate programs or computers configured to perform dedicated tasks. For example, a computer 102 may include memory that stores a single program or multiple programs. Additionally, computers 102 may execute one or more programs located remotely from computers 102. For example, computers 102 may access one or more remote programs stored in memory included with a remote component (not shown) that, when executed, perform operations consistent with the disclosed embodiments. In certain aspects, computers 102 may include server software that generates, maintains, and provides user applications, customer data, user profile information, user demographics information, physical/electronic retail store information, and/or the like. In other aspects, computers 102 may connect separate server(s) or similar computing devices that generate, maintain, and provide such services.

Other components known to one of ordinary skill in the art may be included in system 100 to process, transmit, provide, and receive information consistent with the disclosed embodiments. In addition, although not shown in FIG. 1, components of system 100 may communicate with each other through direct communications. Direct communications may use any suitable technologies, including, for example, wired technologies (e.g., Ethernet, PSTN, etc.), wireless technologies (e.g., Bluetooth™, Bluetooth LE™, Wi-Fi™, near field communications (NFC), etc.), or any other suitable communication method(s) that provide a medium for transmitting data between separate devices.

Figure 2:
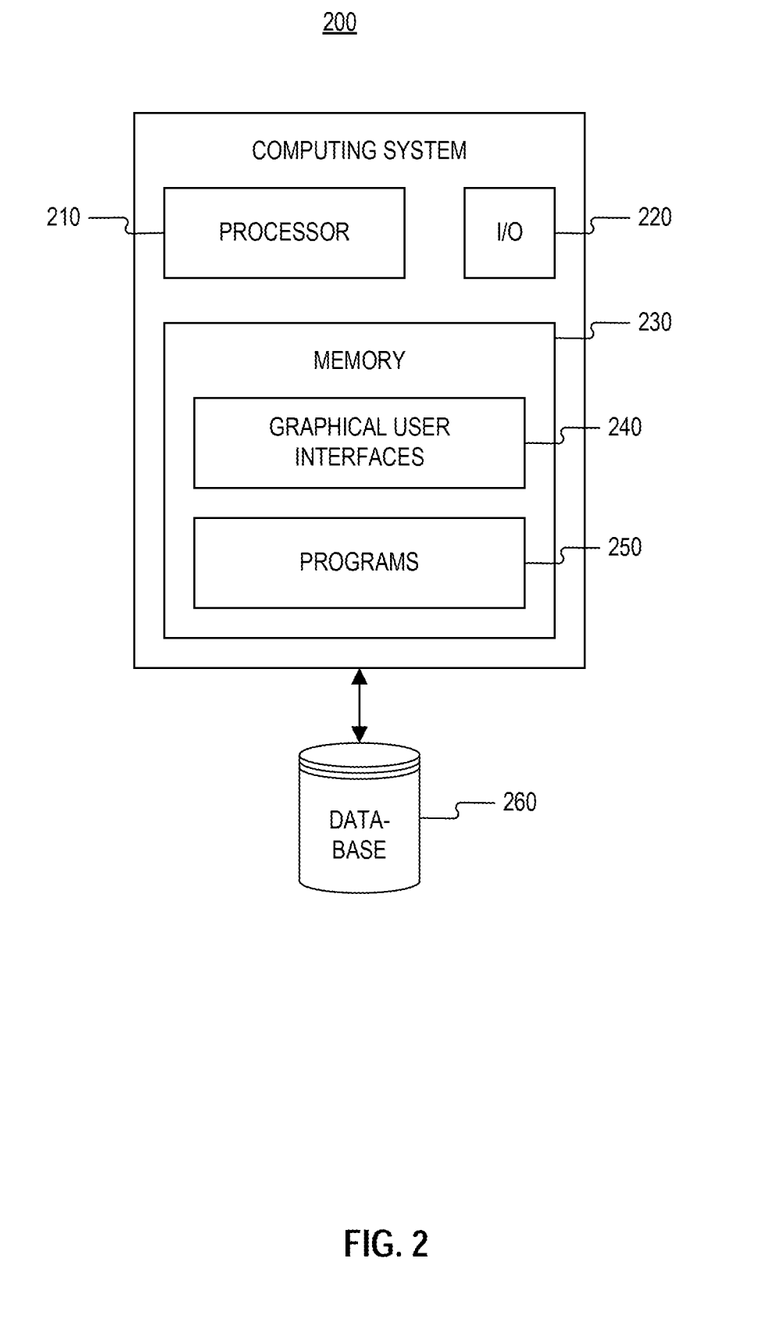
FIG. 2 is a block diagram of exemplary computing equipment for performing distributed computing operations, consistent with disclosed embodiments.

FIG. 2 is a block diagram of exemplary computing system 200 for extracting information from a text string, consistent with disclosed embodiments. One of more of computer(s) 102 can be implemented as a computing system, such as computing system 200, consistent with disclosed embodiments. In one embodiment, computing system 200 may have one or more processors 210, one or more memories 230, and one or more input/output (I/O) devices 220. In some embodiments, computing system 200 may take the form of a server, general-purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 250 that may perform one or more operations when executed by processor 210. The disclosed embodiments are not limited to separate programs or computers configured to perform dedicated tasks. For example, memory 230 may include a program 250 that performs the functions of computing system 200, or program 250 could comprise multiple programs. Additionally, processor 210 may execute one or more programs located remotely from computing system 200. For example, computer(s) 102 and other devices within communication network 104, may, via computing system 200 (or variants thereof), access one or more remote programs that, when executed, perform functions related to certain disclosed embodiments. Processor 210 may further execute one or more programs located in database 260. In some embodiments, programs 250 may be stored in an external storage device, such as a cloud server located outside of computing system 200, and processor 210 may execute programs 250 remotely.

Programs executed by processor 210 may cause processor 210 to execute one or more processes related to processing data related to the operation of a distributed processing system ("operational data"). In some aspects, this operational data may be formatted as text strings. For example, the operational data can include system log data, such as those generated by firewalls, servers, and switches. As additional example, the data can include transaction data. Programs executed by processor 210 may further cause processor 210 to execute one or more processes for analyzing this operational data. For example, when the operational data is formatted as a text string, these processes can analyze the text strings and extract information from within the text strings. Programs executed by processor 210 may further cause processor 210 to execute one or more processes related to aggregating data for correlation with the text strings.

Memory 230 may also store data reflecting any type of information in any format that the system may use to perform operations consistent with the disclosed embodiments. Memory 230 may store instructions to enable processor 210 to execute one or more applications, such as server applications, a data aggregation application, a customer demographic statistical analysis application, network communication processes, and any other type of application or software. Alternatively, the instructions, application programs, etc. may be stored in an external storage (not shown) in communication with computing system 200 via communication network 104 or any other suitable network. Memory 230 may be a volatile or non-volatile, magnetic, semiconductor, tape, optical, removable, non-removable, or other type of storage device or tangible (e.g., non-transitory) computer-readable medium.

Memory 230 may include graphical user interfaces ("GUI") 240. GUI 240 may allow a user to access, modify, etc. operations of computing system 200. Additionally or alternatively, GUI 240 may be stored in database 260 or in an external storage (not shown) in communication with computing system 200 via network 104 or any other suitable network.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components that provide interfaces to one or more input devices, such as one or more keyboards, mouse devices, and the like, which may enable computing system 200 to receive input from an operator of a computer 102.

Computing system 200 may also comprise one or more database(s) 260. Alternatively, computing system 200 may be communicatively connected to one or more database(s) 260. Computing system 200 may be communicatively connected to database(s) 260 through network 120. Database 260 may include one or more memory devices that store information and are accessed and/or managed through computing system 200. By way of example, database(s) 260 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 260 may include computing components (e.g., database management system, database server, etc.) configured to receive and process requests for data stored in memory devices of database(s) 260 and to provide data from database 260.

As discussed above, one or more of computer(s) 102 can be implemented using a computing system, such as computing system 200. Further, although sometimes discussed here in relation to computer(s) 102, it should be understood that variations of computing system 200 may be employed by other components of system 100, including user devices or databases. Computing system 200 may be a single server or may be configured as a distributed computer system including multiple servers or computers that interoperate to perform one or more of the processes and functionalities associated with the disclosed embodiments.

Recording a Distributed Operation

In some embodiments, two or more of computer(s) 102 may interact to perform a distributed operation. In some aspects, this operation can include component operations that together make up the overall operation. These different component operations can be performed by different ones of computer(s) 102. Certain component operations can be performed sequentially. For example, a first component operation performed by a first one of computer(s) 102 can be followed by a second component operation performed by a second one of computer(s) 102. In some aspects, the second component operation can be dependent on the results of the first component operation. For example, the first one of computer(s) 102 can be configured to provide the results of the first component operation to the second one of computer(s) 102 for use in the second component operation. In some aspects, these results can be provided using network 104. In some embodiments, computer(s) 102 may be maintained and controlled by separate and/or independent entities, may comprise similar or different hardware and/or software architectures, and may carry out similar tasks in different ways.

Figure 3:
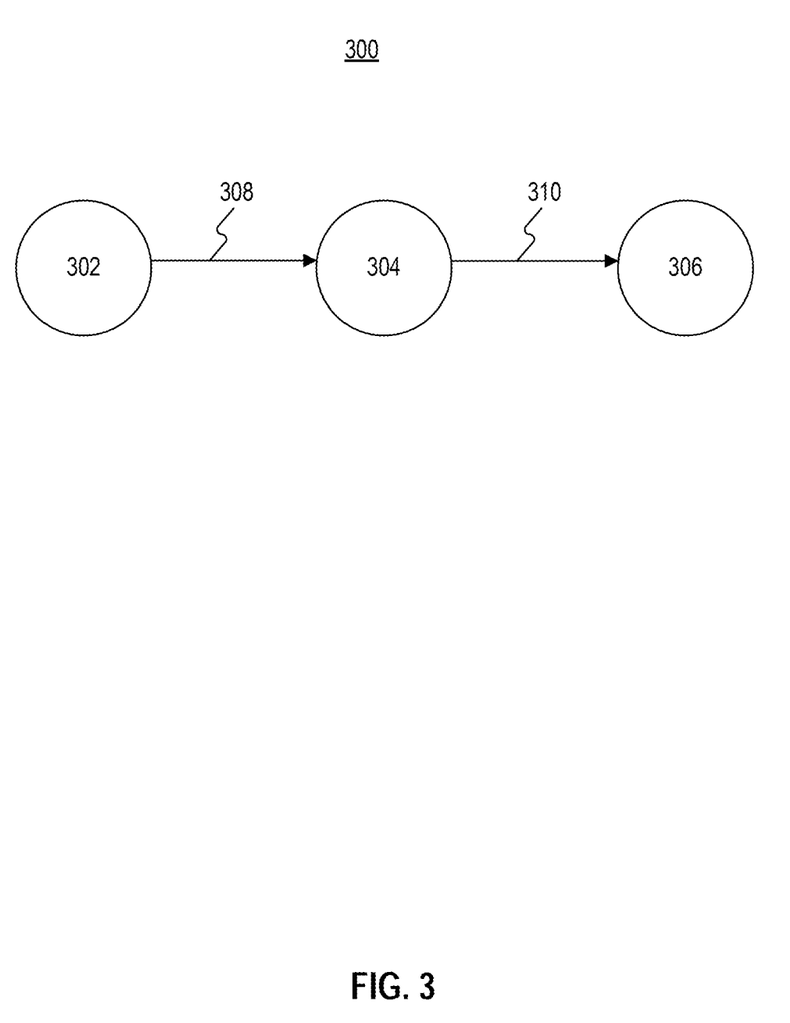
FIGS. 3-5 depict acyclic graphs, representative of distributed computing operations.

As shown in FIG. 3, performance of the operation may be represented as a graph 300. Graph 300 includes nodes 302, 304, and 306. Nodes 302, 304, and 306 may represent one of computer(s) 102 performing parts of a distributed operation. Performance of the distributed operation can be represented as traversing the graph beginning with node 302, moving to node 304, and continuing to node 306. Edges 308 and 310 may represent transitions between a part of the operation being performed at a node and a next part of the operation being performed at another node.

Consistent with disclosed embodiments, operation data may be created and/or maintained that provides information describing the distributed operation. This operation data can include a text string. The text string may be made up of any combination of characters, for example characters defined by the American Standard Code for Information Interchange (ASCII).

In some embodiments the operation data can be generated while the distributed operation is being performed. For example, the computing systems responsible for performance of components of the distributed operation can be configured to receive one or more items of operation data and generate an item of operation data as the operation is performed. For example a computing system can receive one or more text strings indicative of performance of prior components of the distributed operation and generate a text string based on these one or more received text strings and the results of the component of the operation performed by the computing system. As a further example, a computing system can receive two strings for computing systems, generate a text string representing performance of a component operation, and generate an output string based on the received text strings and the generated text string. For example, the computing system can append the text strings to generate the output text string.

In some embodiments the operation data can be generated once performance of the distributed operation is complete. For example, the computing systems responsible for performance of components of the distributed operation can be configured to provide information for generating the operation data to another computing system. In some aspects the other computing system can be a computing system associated with another node a path in the graph representing the distributed operation. For example, this other node can be the next node in the path, an intermediate node in the path, or the final node in the path. The computing system associated with this other node can be configured to generate the operation data based on information received from computer systems represented by other nodes on the path. For example, once the computing system associated with this other node receives at least some of the information from these computer systems, it may create the operation data. In some embodiments, the computing system associated with this other node can subsequently update the operation data with information received from computing systems representing additional nodes on the path, or additional information from computing systems that previously provided information. For example the computing system associated with this other node can create a text string based on components of the distributed operation performed by that computing system and information received from computing systems representing the other node on the path.

The operation data may be configured to convey any information relevant to the distributed operation. For example, the operation data may be configured to convey information related to operation status, summary, location, progress, success/failure, error reporting, history, time, date, security, access, category, or any other information relevant to the distributed operation. Any one or more of these categories of information may be included in the text string. Furthermore, in addition to the text string, the operation data may include one or more designated fields set aside for a particular type of information.

Consistent with disclosed embodiments, the operation data can include information concerning the distributed operation overall. For example, the operation data may include information related to the nature of the distributed operation, the one or more of the node computers involved in the distributed operation, a role or roles that the one or more node computers played in the distributed operation, a time and/or date that the distributed operation took place, one or more locations involved in the distributed operation, etc. In some embodiments, the operation data may include one or more indications identifying one or more node on the path. For example node 302 may modify the text string to refer to itself in textual form, for example by adding "node 302" or "302" or some other identifier of this node to the text string.

As described above, in some embodiments, the text string may be modified to by multiple node computers. For example, one of computer(s) 102 involved in the distributed operation may modify the text string. Thus, the text string may include information generated by or reflective of more than one node computer. The ones of computer(s) 102 may inconsistently perform modifications to the text string. For example, in some embodiments, the computing systems represented by various nodes may modify the text string in different ways. These differences may arise from differences in computing system configuration, for example variations resulting from different organizations controlling different computing systems represented by different nodes, different software types or versions, component operations performed by the computing systems represented by the node, location of the node, etc. Furthermore, modifications to the text string may modify characters, remove characters, concatenate additional characters, overwrite or shift existing text of the text string, etc. In some embodiments, shifting text may lead to shifted text being cut off and removed from the text string, for example as the shifting pushes text toward a character limit of the text string.

Tables 1-3 provide examples of information that may be included in the text string at particular nodes, to represent the operation of graph 300.

TABLE 1

| Node | Text string |
|------|-------------|
| 302  | "302"       |
| 304  | "304:302"   |
| 306  | "306"       |

Table 1 provides an example of information that may be included in a text string memorializing a distributed observation involving computing systems represented by node 302, node 304, and node 306 of graph 300. In the example of table 1, the computing system represented by node 302 adds the characters "302" to the text string. This may be done as in indication of node 302's involvement in the operation. The computing system represented by node 304 adds "304:" to the string, resulting the in the string "304:302". This may be done as an indication of node 304's involvement in the operation while maintaining the indication of node 302's involvement as well. The computing system represented by node 306 changes the text string to "306", removing "304:302". This may be done to eliminate references to nodes 302 and 304.

TABLE 2

| Node | Text string |
|------|-------------|
| 302  | "302"       |
| 304  | "Three zero four-302" |
| 306  | "Three hundred six: Three zero four-202" |

Table 2 provides another example of information that may be included in a text string memorializing a distributed observation involving computing systems represented by nodes of graph 300. In the example of table 2, as in table 1, the computing system represented by node 302 adds the characters "302" to the text string. The computing system represented by node 304, however, adds "Three zero four—" to the string, resulting the in the string "Three zero four—302". This may be a different kind of indication of node 304's involvement in the operation while maintaining the indication of node 302's involvement as well. The computing system represented by node 306 adds "Three hundred six:" to the string, resulting the in the string "Three hundred six: Three zero four—202". This may be done to include an indication of each of the nodes involved in the text string. The variation in format between punctuation and numeric characters vs. numbers represented as words may be due to differences in configuration of the nodes, and thus, the manner in which the distributed operation is memorialized may vary.

TABLE 3

| Node | Text string |
|------|-------------|
| 302  | "302: OCT012017" |
| 304  | "302: OCT012017" |
| 306  | "302: OCT012017" |

Table 3 provides another example of information that may be included in a text string memorializing a distributed observation involving computing systems represented by nodes of graph 300. In the example of table 3, the computing system represented by node 302 adds the characters "302: OCT012017" to the text string. This may be an indication of node 302's involvement in the operation in addition to additional information, specifically, the date that they operation took place. In the example of table 3, the computing system(s) represented by nodes 304 and 306 do not change the text string based on their involvement in the operation, but continue to propagate the text string, as modified by the computing system represented by node 302.

As would be appreciated by one of skill in the art, the examples presented in tables 1-3 are not intended to be limiting. Numerous other variations of information will be apparent to those of skill in the art.

Figure 4:
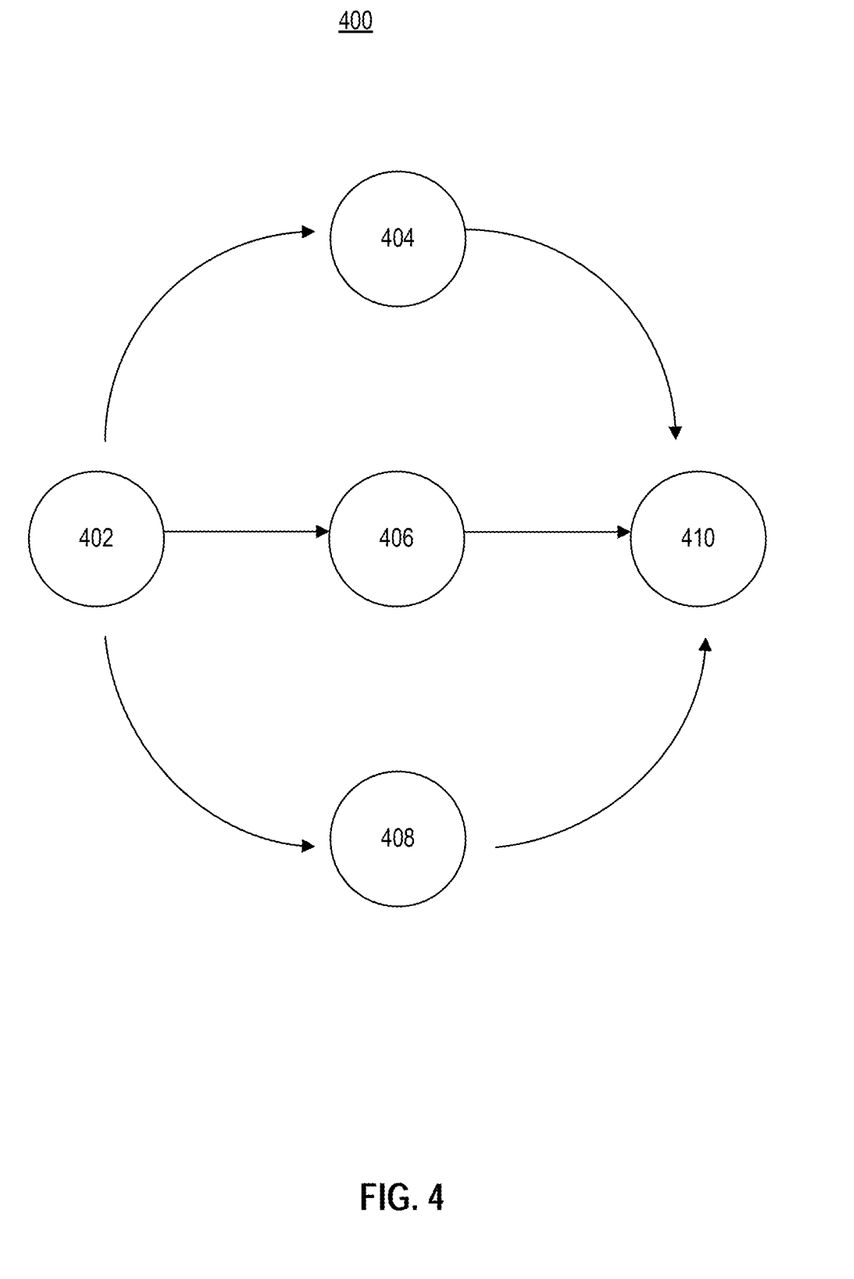

FIG. 4 depicts another example of a graph consistent with the present embodiments, graph 400. Graph 400 includes nodes 402, 404, 406, 408, and 410, which may be similar to nodes 302, 304, and 306. In the example of FIG. 4, the operation may proceed from node 402 to 404, from node 402 to 406, or from node 402 to 408. The operation may proceed from node 404 to 410, from node 406 to 410, or from node 408 to 410. Whether the operation passes from node 402 to node 404, node 406, or node 408 may be based on a number of factors. For example, the nature of the operation, the information involved, information included in a text string from an earlier node, load balancing, and other factors may be involved in the determination of which node the operation will pass to after node 402.

Nodes 404, 406, 408, as an example, may modify the text string in different ways. Tables 4-6 provide examples of information that may be included in the text string at particular nodes, to represent the operation of graph 400.

TABLE 4

| Node | Text string |
|------|-------------|
| 402  | "402" |
| 404  | "402" |
| 410  | "402" |

Table 4 provides an example of information that may be included in a text string memorializing a distributed observation involving computing systems represented by nodes of graph 400 from node 402 to node 404 to node 410. In the example of table 4, the computing system represented by node 402 adds the characters "402" to the text string. Similar to the example shown in table 3, the computing systems represented by nodes 404 and 410 do not change the text string based on their involvement in the operation, but continue to propagate the text string, as modified by the computing system represented by node 402.

TABLE 5

| Node | Text string |
|------|-------------|
| 402  | "402" |
| 406  | "406: 402" |
| 410  | "406: 402" |

Table 5 provides another example of information that may be included in a text string memorializing a distributed observation involving computing systems represented by node 402, node 406, and node 410 of graph 400. In the example of table 5, the computing system represented by node 402 adds the characters "402" to the text string as in table 4. Similar to the example in table 1, the computing system represented by node 406 adds "406:" to the string, resulting the in the string "406: 402". Then, as in table 4, the computing system represented by node 410 does not change the text string based on its involvement in the operation, but continues to propagate the text string, as modified by node 406.

TABLE 6

| Node | Text string |
|------|-------------|
| 402  | "402: OCT012017" |
| 408  | "408: OCT012017" |
| 410  | "408: OCT012017" |

Table 6 provides another example of information that may be included in a text string memorializing a distributed observation involving computing systems represented by node 402, node 408, and node 410 of graph 400. Similar to the example of table 3, the computing system represented by node 402 adds the characters "402: OCT012017" to the text string. Then, the computing system represented by node 408 modifies the text string, resulting in the text string "408: OCT012017". As an example, this modification may be made to remove reference to node 402 and add a reference to node 408. As in tables 4 and 5, the computing system represented by node 410 does not change the text string based on its involvement in the operation, but continues to propagate the text string, as modified by node 408.

Figure 5:
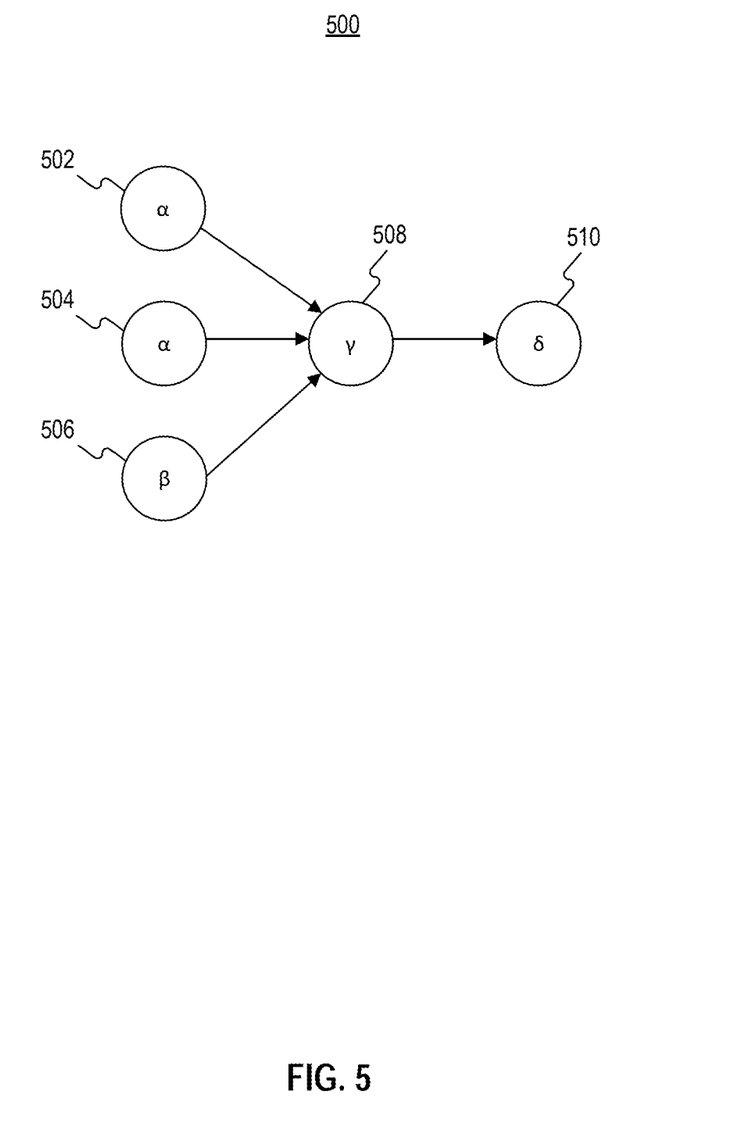

In some embodiments, different nodes may share a common identifier, or affect operation data in the same manner. FIG. 5 depicts another example of an acyclic graph consistent with the present embodiments, graph 500. Graph 500 includes nodes 502, 504, 506, 508, and 510, which may be similar to nodes 302, 304, and 306 and/or 402, 404, 406, 408, and 410. Nodes 502, 504, 506, 508, and 510 may be represented respectively as "α," "α," "β," "γ," and "δ." In this example, nodes with the same or substantially the same identifier may operate in similar ways. For example nodes with the same identifier may produce and/or modify operational data in similar ways or ways that include common characteristics. In some embodiments, when the nodes are associated with entities, such as network devices or businesses, the nodes with the same or substantially the same identifier may be associated with the same network devices (or types of network devices) or the same businesses. In spite of the same identifier, differences may remain.

Decoding a Record of a Distributed Operation

Operation data such as the text strings described above may be transmitted, stored, and/or maintained along with other data associated with the operation. Additionally or alternatively, operation data may be transmitted at any point to any node or other device of system 100. The operation data may analyzed to determine information related to the progress, status, identity, outcome, etc. of the related distributed operation.

Figure 6:
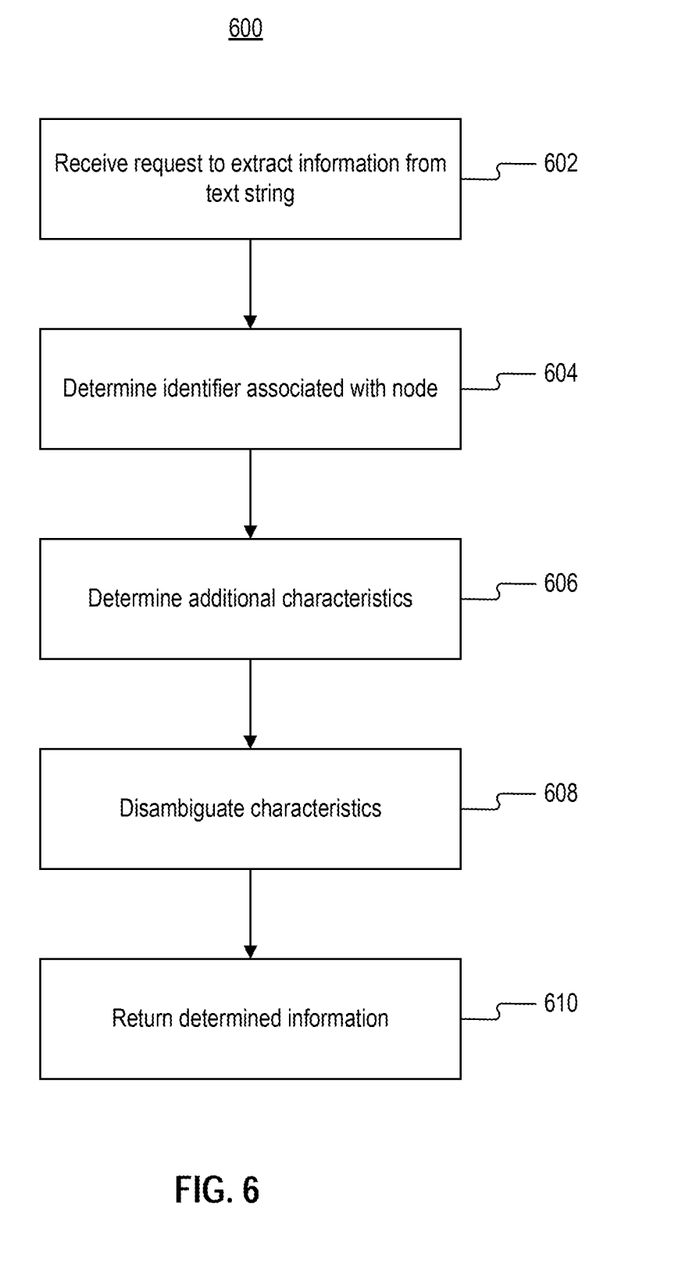
FIG. 6 is a flowchart of an exemplary process for extracting information from a text string generated in a distributed computing operation.

Information about the operation and/or nodes involved may be extracted from the operation data described above. FIG. 6 depicts a process 600 for extracting information attributes from the operation data. The process depicted in FIG. 6 may be performed by any device of system 100. For example, in some embodiments, one of computer(s) 102 may be configured to extract information from the operation data. In some embodiments, the one of computer(s) 102 may have performed at least a component of the distributed operation memorialized in the operation data. In various embodiments, the one of computer(s) 102 may not have performed any of the distributed operation memorialized in the operation data. The one of computer(s) 102 may have received the operation data from another computing system, which in turn may have performed a component of the distributed operation.

Process 600 may comprise detecting attributes such as known identifiers of nodes and other information included in the operation data, and identifying and resolving ambiguities. Process 600 is described below with regard to text strings, though this description is not intended to be limiting.

At step 602, system 100 may receive a request to extract information from a text string. The request may be in the form of a one-off request for a particular string or may be a recurring process performed for numerous strings. For example strings may be automatically created and transmitted for storage in a database. A request to extract information from a text string may be created as a matter of course when the string reaches a particular place or status within system 101.

At step 604, system 100 may determine, based on the text string, an identifier associated with a node. Any form of search or correlation may be used to find the identifier within the string. As shown in the examples above, more than one node identifier may be present in a text string. In such instances, step 602 may include determining the more than one identifier within the text string. Therefore, at step 604, system 100 may also determine a relationship between the more than one identifier present in the text string. System 100 may be configured to detect and strip out an extraneous characters, such as prefix or suffix characters in the raw text string. In some embodiments, system 100 may "tokenize" the text string by performing any one or more of transforming all letters to uppercase (or lowercase), removing brackets and/or quotes, splitting on punctuation and/or whitespace, removing one-letter tokens, and stripping plural words of suffixes. A result of tokenization may be stored as a list. System 100 may also identify whether the information in the text string is dynamic or static (i.e., whether the information changes with every transaction, resulting in no two transactions being the same for a single node. System 100 may determine whether the dynamic information in the text string may be recognized, save any useful information, and then normalize to a standard node identifier.

In some embodiments, system 100 may interpret a text string to indicate that one node passed on information from another node. The string "406: 402," as shown above in table 4 may be interpreted in this way.

At step 606, system 100 may determine one or more additional characteristics of the operation. The additional characteristics may be determined based on the text string or may come from designated fields. For example, system 100 may base the determination on the determination at step 602 in combination with any additional information that may be present in the text string in addition to information related to the node identifier determined at step 602. For example, system 100 may compare information in the text string (or combination of information in the text string and information from designated fields) to a database of candidate information or outcomes to identify matches. Such matching may be carried out via any appropriate algorithm, for example, regular expression (regex), conditional rules, and/or a fuzzy matching algorithm such as a trigram search. Alternatively or additionally, a gradient boosting machine (GBM) may be employed to score possible candidates for characteristics present in the text string. The GBM may give varied weight to particular types of information. For example, particular designated fields may be weighted more heavily than others. The use of a GBM is merely exemplary. In embodiments, any binary classification or other form of matching may be used.

At step 608, system 100 may disambiguate one or more additional characteristics determined in the text string. In some embodiments, in an instance in which multiple candidates for a result are tied for likelihood based on, for instance, a model score (i.e., an ambiguous match), system 100 may withhold the result, or withhold the result unless it is consistent with other information determined from the text string.

At step 610, system 100 may return the information determined in process 800, consistent with the nature of the request at step 602.

Exemplary Use Cases

In some embodiments, the operation performed by system 100 may comprise processing of a transaction (e.g., a credit, debit card, Finicity, Plaid, or Intuit transaction). In this example, the nodes described above may represent computer systems such as point of sale systems, bank systems, credit card processing systems, credit bureau systems, etc. As an example, in FIG. 4, node 402 may represent a merchant point-of-sale system, nodes 404, 406, and 408, may represent credit card processing systems, and node 410 may represent a bank system. As another example, in FIG. 5, nodes 502 and 504 may represent different locations of a single merchant, node 506 may represent a location of a different merchant, node 508 may represent a credit card processing system, and node 510 may represent a bank system.

Furthermore, in this example the operational data may memorialize a credit card transaction. In this example, extracting the information may include determining attributes such as the parties to the credit card transaction, e.g., the point-of-sale, merchant, and any intermediaries involved in the transaction. More specifically, at step 602, system 100 may receive a request to extract a merchant identifier from a text string generated during a distributed operation involving these entities (e.g., the processing of a financial transaction, such as a credit card transaction). The request may be an individual request received as a query about a particular transaction or may be received as a part of processing of a large number of transactions.

At step 604 of process 600, system 100 may determine a name or other identifier of a merchant associated with the transaction. To accomplish this, system 100 may be configured to detect and strip out an extraneous prefix or suffix characters in the raw text string and/or tokenize the text string as described above. System 100 may also identify whether the description is dynamic or static (i.e., whether the description changes with every transaction, resulting in no two transactions be the same for a single merchant). System 100 may determine whether the dynamic information in the description may be recognized, save any useful information, and then normalize to a standard description of a merchant (e.g., make MusicStore1234 simply MusicStore). System 100 may also identify any intermediate payment or transaction processors involved in the transaction. For example, system 100 may identify intermediaries such as payment intermediaries (e.g., PayPal, Venmo, etc.) and/or service intermediaries (e.g., Seamless, Grubhub, etc.). With the resulting text string, system 100 may identify any merchant name, national chain, brand, or online entity associated with the transaction.

Continuing with the example of processing a transaction, using the identified chain, brand or entity information as described above, at step 606, system 100 may use additional information of the transaction to determine a location of the transaction. For example, system 100 may employ information from dedicated fields such as transaction category, city, state, and zip code to filter possible physical store match candidates found in a database. In some embodiments, system 100 may extract these or other attributes from the text string. Using a chain, brand, or online name, identified in step 604 above, system 100 may use a matching algorithm to further filter the list to a smaller set of physical store location candidates. In an embodiment, system 100 may be configured to employ a fuzzy matching algorithm, such as a Trigram match, to further filter set of physical store location candidates.

Matching may be performed based on any one or more of a number of models. For example, a match may be found based on a trigram score based on the text string match with a database entry. In some embodiments, trigram score, may be determined based on a subset of a text string, for example, when place details are excluded. More specifically, location details like (ST, and PLACE) may be stripped-out. Matching may also be based on category similarity, for example using a Bayesian approach. More specifically, matching may be based on prior knowledge of how often transaction category codes match to categories in a merchant database. Additionally or alternatively system 100 may employ a "best token score" Here, system 100 may place more weight on less commonly seen words that a possible matching text string has in common with an entry in a database. For example, in comparing "The Pizza Haven" with possible matches system 100 may put may more weight on "Pizza" and "Haven" and less on "The." In some embodiments, system 100 may examine one or more common subsequences. In examining common subsequences, system 100 may measure the longest in-order, broken or unbroken, string common to a raw transaction merchant name and a candidate name from a database. For example, "STARBUCKS" and "SBUCKS" share a common subsequence of length 6. In some embodiments, system 100 may examine presence of a place in the merchant name. For example, system 100 may determine if the name of the place e.g., "New York" is in the merchant name e.g., "New York Pizza". In some embodiments a merchant existence score may be employed. The merchant existence score may comprise a score between 0-1 indicating whether the merchant is a going concern. The merchant existence score may be correlated with record quality. For example, given a strong match in which the merchant is deemed less likely to be in business (i.e., closed), the overall match score may be less than without incorporation of the existence score.

In some embodiments, a GBM model may be used to score all the possible candidates on a scale from 0-1. The model may be based on a number of factors, such as Overall Trigram Score, common subsequence length/overall merchant name length, presence of a location in name (e.g., City, State, Neighborhood), trigram excluding location in name, merchant existence score (from merchant directory), and category matching between a transaction and merchant directory.

At step 608, system 100 may disambiguate findings of the previous steps related to the transaction. For example, a location of an identified merchant with a highest GBM score may be identified. Furthermore, if multiple locations of the identified merchant are tied for highest model score at step 608 (i.e., an ambiguous match), then system 100 may discard fields that are not consistent across all the results are returned. For example, if three coffee shops of the same name all return the highest score, system 100 may return street information if they all exist on the same street, but not return the store address number or phone as those numbers may differ.

At step 610, system 100 may return the chain, brand, online entity, etc. detected in process 600. System 100 may also return any other information determined by process 600, including the confidence score, as well as any transaction or payment intermediary identified (if applicable).

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a merchant has been referred to herein for ease of discussion, it is to be understood that consistent with disclosed embodiments another entity may be detected via disclosed analysis.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for extracting information in a distributed computing operation, comprising:
one or more memory devices storing instructions; and
one or more hardware processors configured to execute the instructions to perform operations comprising:
receiving a request to extract information from a textual string, the textual string comprising operation data generated by a plurality of computing device nodes along a path representing a distributed computing operation, wherein at least one of the plurality of computing device nodes receives information from a previous computing device node along the path, performs a component operation of the distributed computing operation, appends an item of operation data to the textual string based on a result of the performed component operation, and provides the textual string to a subsequent computing device node along the path;
searching for an identifier included in the textual string, the identifier being associated with one of the computing device nodes, the searching comprising determining whether the at least one computing device node utilizes a dynamic description of the performed component operation and resolving a formatting inconsistency by normalizing a plurality of computing device identifiers to a standard format;
identifying, based on the identifiers, at least one intermediary computing device node of the plurality of computing device nodes;
determining a first attribute from the textual string, the first attribute being associated with the identifier and being representative of a physical location where the distributed computing operation took place;
comparing the first attribute and the identifier to a database of candidate information to find a plurality of matching candidates in the database, the matching candidates being determined by generating first confidence scores for the matching candidates based on weights assigned to characteristics present in the textual string; and
providing, in response to the request, the identifier, the first attribute, information indicating the at least one intermediary computing device node, and information indicating the matching candidates and the first confidence scores.

2. The system of claim 1, wherein searching for the identifier includes discarding extraneous characters.

3. The system of claim 1, wherein the one or more hardware processors are configured to perform the operations further comprising:
determining a second attribute from the textual string, the second attribute suspected to be associated with the identifier;
comparing the second attribute and the identifier to the database of candidate information to find a match based on a second confidence score as to whether the candidate information is associated with the identifier;
determining that the second confidence score indicates that the association is inconclusive; and
based on the determination that the association is inconclusive, discarding the second attribute from the textual string.

4. A method for extracting information from a textual string, comprising the following operations performed by one or more hardware processors:
receiving a request to extract information from the textual string, the textual string comprising operation data generated by a plurality of computing device nodes along a path representing a distributed computing operation, wherein at least one of the plurality of computing device nodes receives information from a previous computing device node along the path, performs a component operation of the distributed computing operation, appends an item of operation data to the textual string based on a result of the performed component operation, and provides the textual string to a subsequent computing device node along the path;
searching for an identifier included in the textual string, the identifier being associated with one of the computing device nodes, the searching comprising determining whether the at least one computing device node utilizes a dynamic description of the performed component operation and resolving a formatting inconsistency by normalizing a plurality of computing device identifiers to a standard format;
identifying, based on the identifiers, at least one intermediary computing device node of the plurality of computing device nodes;
determining a first attribute from the textual string, the first attribute being associated with the identifier and being representative of a physical location where the distributed computing operation took place;
comparing the first attribute and the identifier to a database of candidate information to find a plurality of matching candidates in the database, the matching candidates being determined by generating first confidence scores for the matching candidates based on weights assigned to characteristics present in the textual string; and
providing, in response to the request, the identifier, the first attribute, information indicating the at least one intermediary computing device node, and information indicating the matching candidates and the first confidence scores.

5. The method of claim 4, wherein searching for the identifier includes discarding extraneous characters.

6. The method of claim 4, wherein the one or more hardware processors are configured to perform the operations further comprising:
determining a second attribute from the textual string, the second attribute suspected to be associated with the identifier;
comparing the second attribute and the identifier to the database of candidate information to find a match based on a second confidence score as to whether the candidate information is associated with the distributed computing operation;
determining that the second confidence score indicates that the association is inconclusive; and
based on the determination that the association is inconclusive, discarding the second attribute from the textual string.

7. A non-transitory computer readable medium for extracting information from a textual string, the non-transitory computer readable medium comprising instructions, which when executed by a processor, cause a computer system to perform operations comprising:
receiving a request to extract information from the textual string, the textual string comprising operation data generated by a plurality of computing device nodes along a path representing a distributed computing operation, wherein at least one of the plurality of computing device nodes receives information from a previous computing device node along the path, performs a component operation of the distributed computing operation, appends an item of operation data to the textual string based on a result of the performed component operation, and provides the textual string to a subsequent computing device node along the path;

searching for an identifier included in the textual string, the identifier being associated with one of the computing device nodes, the searching comprising determining whether the at least one computing device node utilizes a dynamic description of the performed component operation and resolving a formatting inconsistency by normalizing a plurality of computing device identifiers to a standard format;

identifying, based on the identifiers, at least one intermediary computing device node of the plurality of computing device nodes;

determining a first attribute from the textual string, the first attribute being associated with the identifier and being representative of a physical location where the distributed computing operation took place;

comparing the first attribute and the identifier to a database of candidate information to find a plurality of matching candidates in the database, the matching candidates being-determined by generating a first confidence score for the matching candidates based on weights assigned to characteristics present in the textual string; and providing, in response to the request, the identifier, the first attribute, information indicating the at least one intermediary computing device, and information indicating the matching candidates and the first confidence scores.

8. The non-transitory computer readable medium of claim 7, wherein searching for the identifier includes discarding extraneous characters.

9. The non-transitory computer readable medium of claim 2, wherein the computer system performs operations further comprising:

determining a second attribute from the textual string, the second attribute suspected to be associated with the identifier;

comparing the second attribute and the identifier to the database of candidate information to find a match based on a second confidence score as to whether the candidate information is associated with the distributed computing operation;

determining that the second confidence score indicates that the association is inconclusive; and based on the determination that the association is inconclusive, discarding the second attribute from the textual string.

* * * * *